United States Patent [19]

Martorano et al.

[11] Patent Number: 4,570,151
[45] Date of Patent: Feb. 11, 1986

[54] SPEEDOMETER DISPLAY OF SIMULATED ANALOG NEEDLE AND ODOMETER ON ELECTROLUMINESCENT PANEL

[75] Inventors: Joseph A. Martorano, Sherman Oaks; Robert J. Bell, Moorpark, both of Calif.

[73] Assignee: Sigmatron Nova, Inc., Thousand Oaks, Calif.

[21] Appl. No.: 455,211

[22] Filed: Jan. 3, 1983

[51] Int. Cl.$^4$ .................. B60Q 1/00; G09G 3/20; G09G 3/30

[52] U.S. Cl. .................. 340/52 R; 340/753; 340/781

[58] Field of Search .......... 340/52 R, 52 F, 752, 340/753, 765, 754, 721, 716, 781; 364/518

[56] References Cited

U.S. PATENT DOCUMENTS 4,240,074  12/1980  Gibson et al. .......... 340/753
4,467,323  8/1984  Kling et al. .......... 340/721

*Primary Examiner*—John W. Caldwell, Sr.
*Assistant Examiner*—Brent Swarthout
*Attorney, Agent, or Firm*—John T. Matlago

[57] ABSTRACT

An electroluminescent panel is provided for displaying a simulation of a speedometer for a vehicle. The simulation includes a rotating needle for indicating the speed of the vehicle and a drum type odometer for keeping track of the total mileage of travel of the vehicle. The electroluminescent panel has a microcomputer and a video ram associated therewith. On successive (Direct Memory Access) DMA periods of a millisecond operating cycle, the microcomputer is programmed to read columns of data out of the video ram to be displayed as corresponding columns of pixels on the electroluminescent panel. Between the successive Direct Memory Access periods of the millisecond operating cycle, the microcomputer is programmed to execute needle control and odometer control routines to update the data in the video ram in response to an input fed to the microcomputer indicative of the speed of the vehicle upon which the electroluminescent panel is mounted.

5 Claims, 11 Drawing Figures

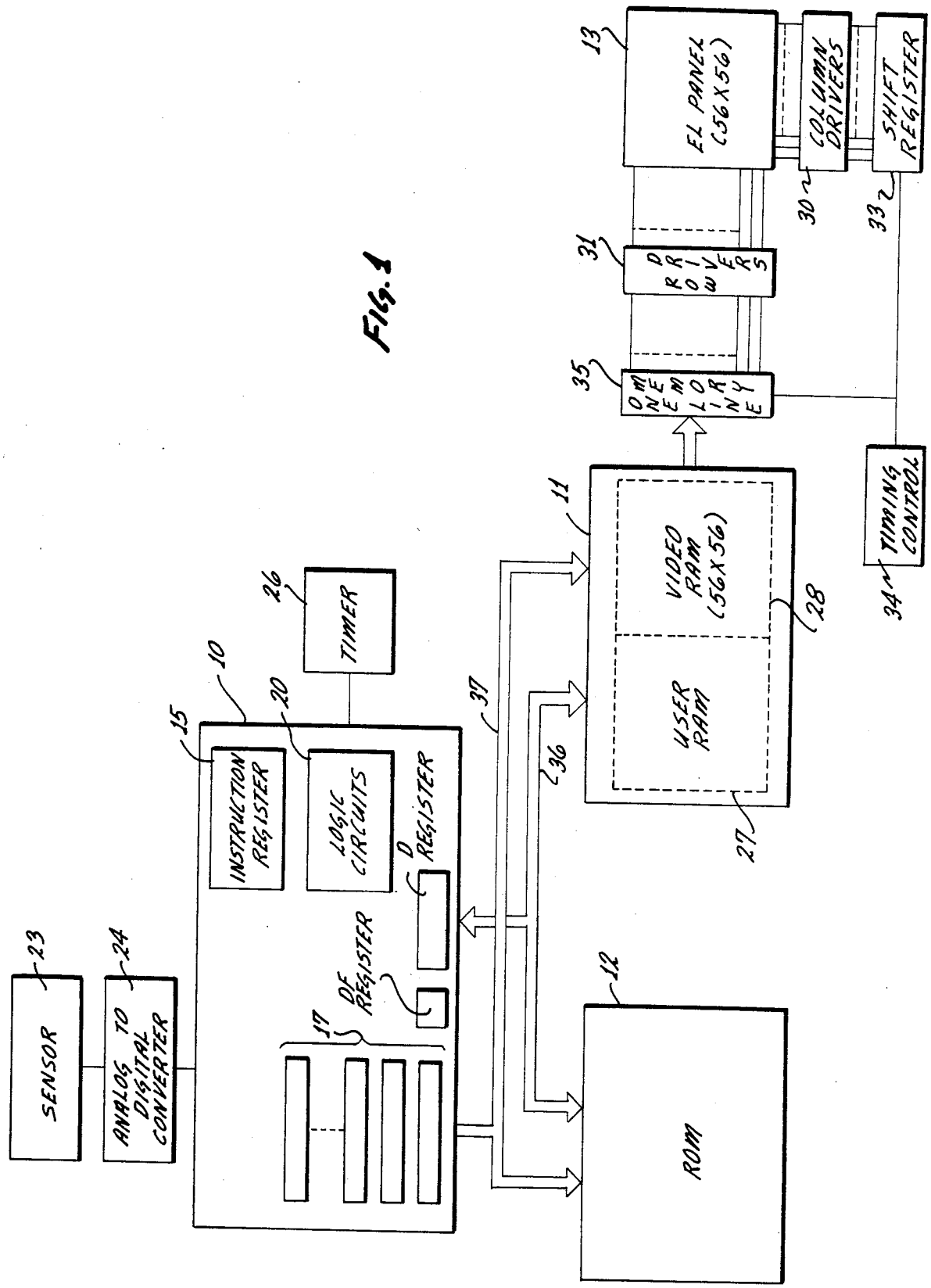

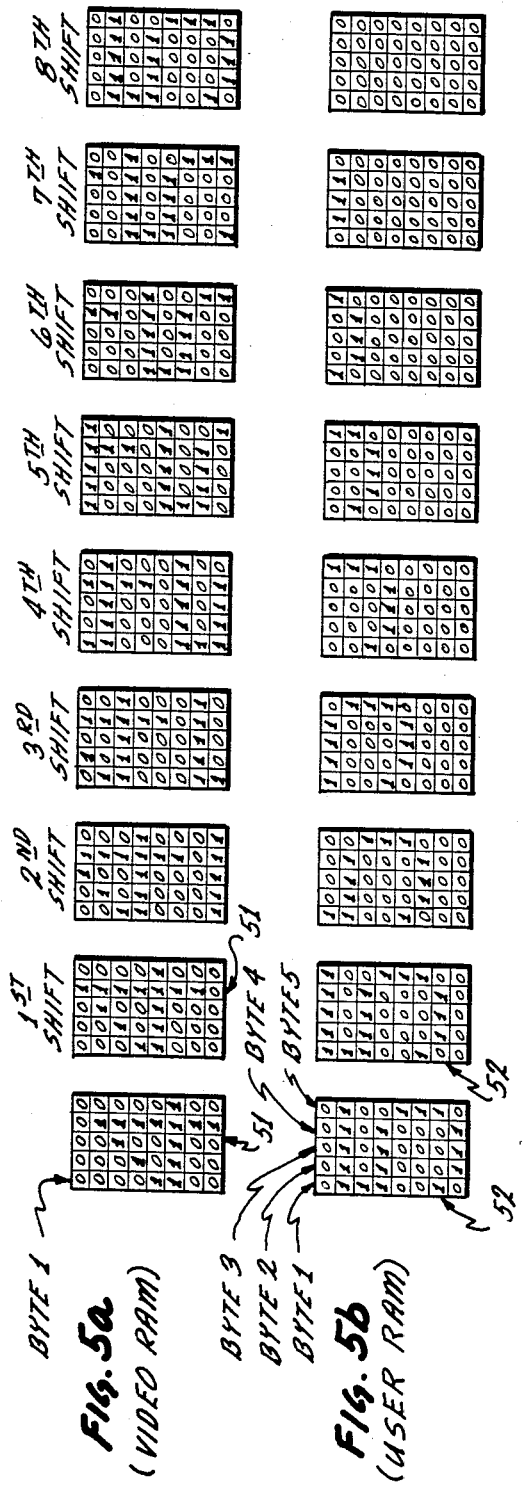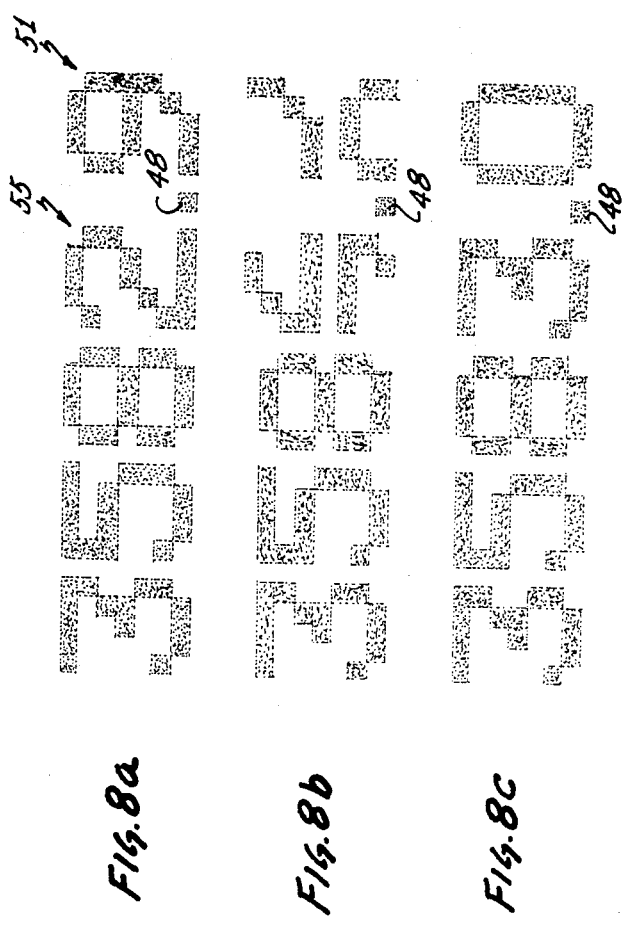

SPEEDOMETER DISPLAY OF SIMULATED ANALOG NEEDLE AND ODOMETER ON ELECTROLUMINESCENT PANEL

BACKGROUND OF THE INVENTION

This invention relates to instruments and more particularly to an electroluminescent (EL) panel controlled by a microcomputer to provide a display thereon simulating the speedometer of a vehicle.

Speedometers for vehicles conventionally include a rotating needle for indicating the speed of the vehicle and a odometer in the form of a drum type counter for keeping track of the total mileage that the vehicle has traveled. The position of the needle and the rolling of the drum digital positions are determined by the use of a flexible shaft that is connected by gears to the vehicle's transmission. It is thus evident that speedometers for vehicles typically employ analog type mechanisms.

SUMMARY OF THE INVENTION

In accordance with the present invention, an EL panel is provided for displaying a simulation of a speedometer thereon. The simulation includes a rotating needle for indicating the speed of a vehicle and a drum type odometer for keeping track of the total mileage of travel of the vehicle. The EL panel has a microcomputer associated therewith for controlling the storage of data in a video ram. On successive (Direct Memory Access) DMA periods of a millisecond operating cycle, the video ram supplies columns of data to be displayed on corresponding columns of pixels on the EL panel. Between the successive DMA periods of the millisecond operating cycle, the microcomputer is programmed to execute needle control and odometer control routines to update the data on the video ram in response to an input speed variable fed to the microcomputer indicative of the speed of a vehicle upon which the EL panel is mounted.

The needle control routine utilizes a line draw utility which reads the input speed variable as stored in memory and adds it to a certain constant corresponding to 0 miles per hour on the x-y plane of the video random access memory (ram). This operation calculates the position of a point B corresponding to the outer end of the needle to be displayed on the EL panel. The position of the inner point A of the needle is always the same since it corresponds to the axis of rotation thereof. Once the outer point B is calculated, the needle control routine instructs the line draw utility to erase the old needle. The line draw utility then generates the successive points on the x-y plane of the video ram that need to be set to draw the needle starting with the point A thereof. As each point on the needle is generated by the line draw utility, its x and y coordinates are supplied to a set utility which first determines the byte on the video ram in which that point is to be located in and then sets that point in that byte of the video ram.

The odometer control routine utilizes a vertical scroll utility to vertically scroll a digit, or group of digits, as needed, from a user ram into the video ram, so that it can be read out and displayed on the EL panel. In particular, the odometer control routine causes the digits to be scrolled one bit (⅛ the vertical height of a digit area) at a time, by making use of the aforementioned input speed variable to calculate the amount of time between the one bit vertical scrolls of the least significant digit of the odometer. Thus, the odometer control routine keeps track of which digits to scroll and where and when to scroll them into the video ram odometer storage location.

The needle control and odometer control routines operate basically independently of each other sharing only the common input speed variable. They are both handled by a master control program that keeps the whole operation organized.

OBJECTS OF THE INVENTION

Accordingly, one of the objects of the present invention is to provide a microcomputer controlled EL panel having a speedometer of a vehicle simulated thereon.

Another object of the present invention is to provide for controlling an EL panel to display an analog representation of a rotating needle thereon which points to a speed on a scale in accordance with an input speed variable of a vehicle.

Still another object of the present invention is to provide for controlling an EL panel to display an analog representation of the digits of a odometer so as to cause the least significant digit and any higher order digits thereof to roll upwardly at a rate in accordance with an input speed variable of a vehicle thereby keeping track of the total distance traveled by the vehicle.

BRIEF DESCRIPTION OF THE DRAWINGS

These and other objects and features of the present invention will appear more fully upon consideration of the specific illustrative embodiment shown in the accompanying drawings in which:

FIG. 1 is a schematic diagram showing in block form the circuits of the electronic display system of the present invention;

FIGS. 5a and 5b show how a least significant digit of the odometer as stored in the video ram is incrementally scrolled upwardly and followed by a next higher digit as stored in the user ram;

FIGS. 8a, 8b and 8c illustrate how a digit of the odometer changes to the next higher digit whenever an adjacent lower order digit changes from a 9 to a 0.

DESCRIPTION OF THE PREFERRED EMBODIMENT

Figure 3:
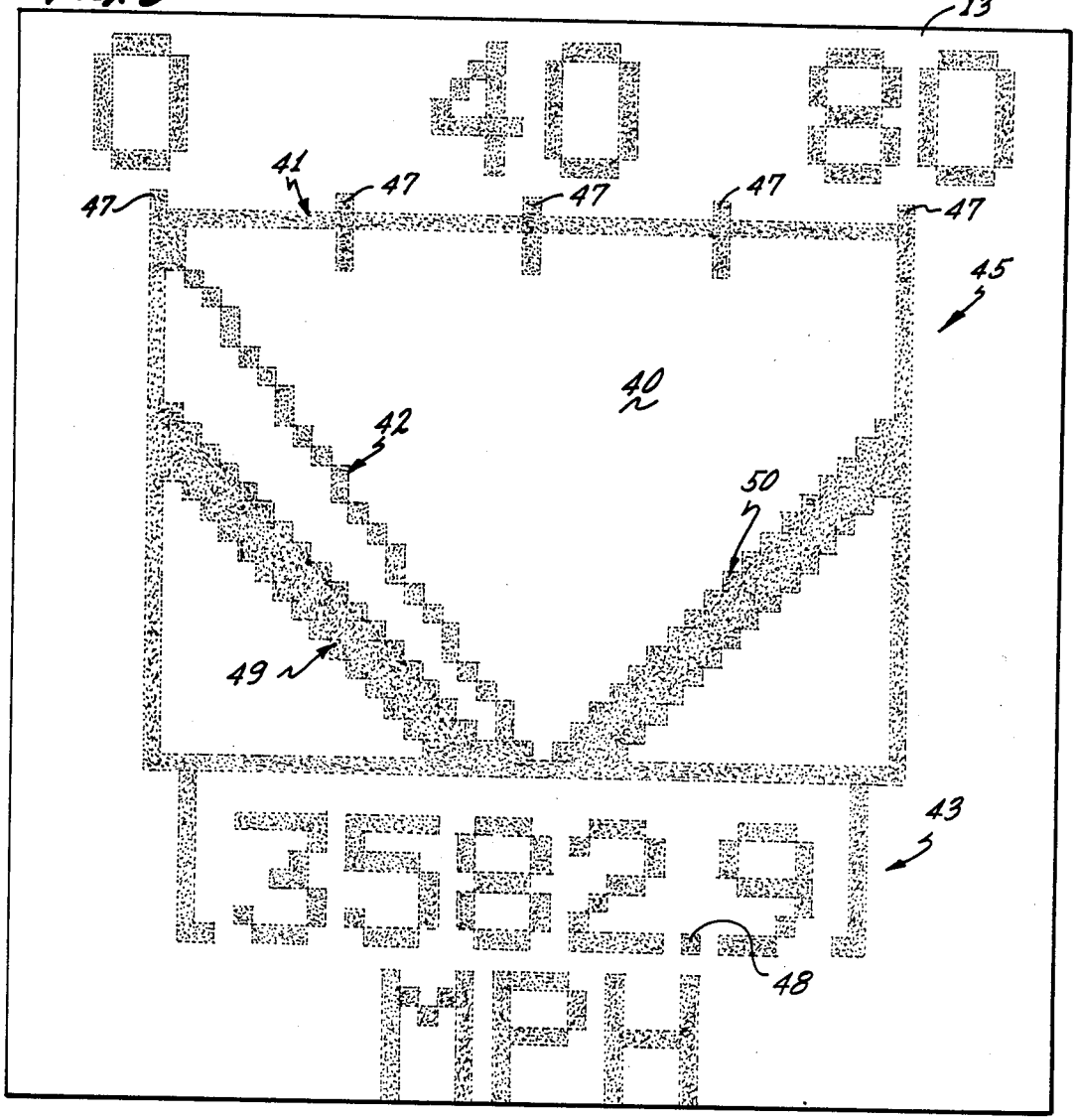
FIG. 3 is a showing of the display representation of the speedometer on the EL panel when the vehicle on which it is mounted is standing still.

Reference will first be made to FIG. 1 which shows an overall block diagram of the electronic circuits in the display system of the present invention. These circuits include a microcomputer 10, a random access memory (ram) 11, a read only memory (rom) 12, and an EL panel 13 comprising a 56×56 matrix array of pixels.

The microcomputer 10 includes an instruction register 15, a plurality of scratch pad registers 17, an eight-bit D register, a one-bit DF register, and logic circuits 20 for manipulating data in accordance with the instruction in the instruction register 15. In addition, the microcomputer 10 is provided with an analog input sensor 23 which feeds an input speed variable in the form of an analog voltage into an analog to digital converter 24 which provides a binary number corresponding to a speed in miles per hour to the microcomputer 10. In addition, a timer 26 for indicating real time is provided. The timer 26 is set by the microcomputer 10 as a function of the input speed variable to provide signals back to the microcomputer 10 at fixed intervals of time.

The microcomputer 10 may be connected to communicate with either the ram 11 or the rom 12 by a undirectional address bus 37 and a bidirectional data bus 36. The ram 11 is divided into two main sections designated as a user ram 27 and a video ram 28. The video ram 28 comprises a 56×56 matrix array of memory elements, each memory element corresponding to a pixel on the EL panel 13.

The EL panel 13 is constructed to include a thin film of phosphor sandwiched within thin layers of a dielectric such as yttria. The sandwich structure is provided with a plurality of parallel thin film transparent indium tin oxide electrodes on the front side thereof and a plurality of counter parallel thin film aluminum electrodes on the back side thereof. In this particular embodiment, the EL panel 13 is one inch square and is provided with 56 aluminum electrodes and 56 indium tin oxide electrodes, the latter being deposited on a glass substrate over which the layers of the sandwich structure are deposited, followed by the aluminum electrodes.

An EL panel suitable for use in the present invention is disclosed in the commonly assigned patent application of Sam H. Rustomji entited Electroluminescent Panel Having Electrode Encapsulating Thin Film Layer filed May 10, 1982 and bearing Ser. No. 376,562.

As shown, the EL panel 13 is provided with column drivers 30 and row drivers 31 for driving the respective column and row electrodes of the EL panel.

A shift register 33 is provided to control the column drivers 30. The shift register 33 advances a pulse therein in response to each timing signal received from a timing control 34 to successively energize its outputs to gate the respective column drivers 30 to apply a drive voltage on each of the column electrodes, in turn, during a millisecond cycle or frame time period.

A one line memory 35 having a storage element associated with each row electrode provides for controlling the respective row drivers 31. A column of data is successively fed out from the video ram 28 into the one line memory 35. In response to each timing signal received from the timing control 34, each storage element of the one line memory storing a binary 1 digit serves to simultaneously gate a respective row driver 31 to apply a drive voltage on an associated row electrode.

Thus, when drive voltages are simultaneously applied across selected ones of the row electrodes and a single selected one of the column electrodes, selected ones of the pixels along the length of the selected column electrode will luminesce momentarily. By repeating the operation of reading a column of data from the video ram 28 each DMA period into the one line memory 35 as the corresponding column electrode on the EL panel is energized, all the pixels on the EL panel are scanned, a column at a time, within a single frame time period by data in the video ram 28.

The microcomputer 10 is operated to communicate with either the rom 12 or the ram 11 via the D register. Typically, an address located in one of the scratch pad registers 17, for example, is applied on the undirectional address bus 37 to provide access to a particular memory register location in ram 11, for example. Then, depending on the instruction, either a byte in the selected memory register location of ram 11 is read out via the data bus 36 into the D register or a byte in the D register is written via the data bus 36 into the selected memory register location in ram 11.

It should now be clearly understood that data is always transferred between the microcomputer 10 and ram 11 or rom 12 as bytes using the D register. Moreover, it should be especially noted that the video ram 28 is a random access memory section having the same number of memory elements as pixels provided on the EL panel 13 and arranged in a similar 56×56 array. Furthermore, the settings of binary 1 digits in the memory cells in the video ram 28 correspond to the pixels on the EL panel 13 that are to be lit or displayed.

As well understood in the art, pixels on the EL panel 13 must be periodically refreshed by the data stored in the video ram 28 and the refreshing of this data to be displayed on the EL panel must be fast enough so that the eye does not realize it is not a continuous pattern or motion. This means that any changes in the data to be displayed must be made fast enough so as to not get below the eye's integration time which is 15 milliseconds.

Figure 2:
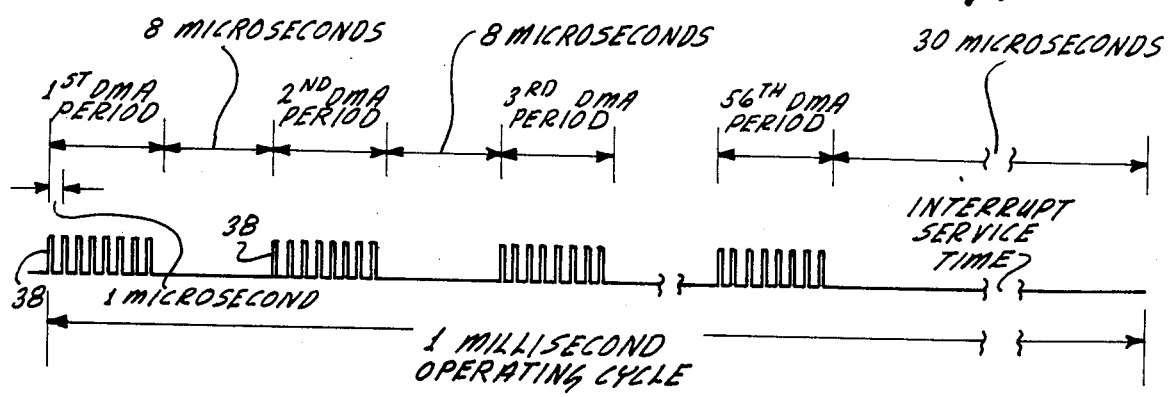
FIG. 2 is a time chart showing the overall mode of operation of the circuits of FIG. 1.

As shown in the time chart of FIG. 2, the mode of operation of the microcomputer 10 and the EL panel 13 is defined by an operating cycle which is 1 millisecond in length. Each millisecond operating cycle includes fifty-six (Direct Memory Access) DMA periods. Each DMA period includes eight DMA pulses 38, each spaced 1 microsecond apart. Accordingly, each DMA period is 8 microseconds long and each DMA period is separated by an equal length of time of 8 microseconds from the previous DMA period. An interrupt service time of approximately 30 microseconds is provided at the end of the 56th DMA period of each millisecond operating cycle.

During each DMA period, the EL panel 13 is given priority over the microcomputer 10 on communicating with the video ram 28. In other words, during each DMA period that the EL panel 13 has access to the video ram 28, the microcomputer 10 is not able to carry out any instructions since it can not communicate with the memory for this purpose.

Accordingly, during each DMA period, each DMA pulse 38 causes the microcomputer 10 to provide for addressing the video ram 28 to load a byte of data from a selected channel therein into the one line memory 35. Thus, the eight DMA pulses 38 occurring during each DMA period provide for transferring one channel of data from the video ram 28 into the one line memory 35. The hardware associated with the EL panel then operates to energize the pixels on the rows of the corresponding column in the EL panel 13 in accordance with the data, i.e., the binary 1 digits in the one line memory 35.

Since there are 56 columns in the matrix of the video ram 28 and in the matrix of the EL panel 13, after 56 DMA periods the data in all the columns of the video ram 28 have been transferred to energize all the columns of the EL panel 13 such that one complete frame of data has been transferred and displayed on the EL panel. During the service time provided at the end of each one millisecond operating cycle, an interrupt pulse is sent to the microcomputer 10 to reset the particular scratch pad register 17 which is being used to count and select the addresses of the bytes in the columns of data in the video ram 28 that are being read out into the one line memory 35. The one millisecond operating cycle is then repeated.

It should now be clearly understood from the time chart of FIG. 2 that in the 8 microsecond interval between the DMA periods the microcomputer 10 is free to communicate with the ram 11 to perform instructions in accordance with the present invention to change the data being stored in the video ram for display on the EL panel 13.

As shown in FIG. 3, the master control program provided to control the operation of the microcomputer 10 starts off by drawing a representation of an analog style speedometer on the EL panel 13. This representation includes a speedometer 45 having a dial 40 with a scale 41 thereon in the form of a straight horizontal line provided with spaced vertical graduation markers 47 therealong. Numbers corresponding to the speed at 0, 40, and 80 miles per hour, for example, are provided above the markers 47 which indicate these speeds on the scale 41. When the representation is initially placed on the EL panel 13, the needle 42 is shown pointing to 0 miles per hour indicating that the vehicle on which the speedometer is mounted is not moving. The heavy angular borders 49 and 50 shown on the representation are merely provided to frame the area of the dial 40 in which the needle 12 swings about its point of rotation to indicate the speed on the scale 41.

Below the speedometer 45 is shown an odometer 43 as normally provided on the same panel with a speedometer for a vehicle. It is noted that the right hand digit on the odometer corresponds to the tenth of a mile, as evidenced by a decimal point 48 preceding it. Inasmuch as the reading on the odometer 43 indicates, at any time, the total mileage that the vehicle on which the speedometer is mounted has travelled, this reading is stored in user ram 27 and placed in the odometer portion of video ram 28 for display whenever the representation of the speedometer is initially placed on the EL panel 13. The letters MPH are displayed on the bottom of the EL panel 13 as typically provided on the speedometer panel of a vehicle.

It should now be clearly understood that in accordance with the present invention, it is desired to show on the EL panel 13 the needle 42 pointing to the speed of the vehicle as indicated by the scale 41 on dial 40. Furthermore, it is desired to have the digits of the numbers displayed by the odometer 43 change, i.e., roll upwardly, to indicate at all times the total miles traveled by the vehicle. All the other data shown on the EL panel in FIG. 3 remains constant.

The input analog sensor 23 to the microcomputer 10, as shown in FIG. 1, senses an analog electrical signal such as a voltage which is indicative of the speed of the vehicle. This analog signal is converted by the analog to digital converter 24 into a binary number indicative of the speed of the vehicle in miles per hour. This input is checked every millisecond or so by the microcomputer 10 and, if changed, is stored in place of the previous input in the user ram 27. This input speed variable is then used to control both the position of the needle 42 on the speedometer 45 and the reading on the odometer 43.

NEEDLE CONTROL

The manner in which the input speed variable is used to control the location of the needle 42 on the speedometer 45 representation on the EL panel will be first described in connection with FIG. 4 which is a partial diagrammatic showing of the video ram 28. It should be appreciated that all the bistable memory elements in video ram 28 are set to correspond to either a binary 1 digit or a binary 0 digit. However, to simplify the presentation in FIG. 4, it is assumed that all the memory elements that are not shown as being set to correspond to a binary 1 digit are set to correspond to a binary 0 digit.

First to be noted is that one way of considering the video ram 28 is that it is an x-y plane having 56 memory elements in the x direction and 56 memory elements in the y direction. Accordingly, any point on the x-y plane can be defined by an x and y coordinate. Moreover, another way of considering the video ram 28 is that it is storing eight vertical bytes in each of its 56 columns and the bytes are located in the video ram in sequential addresses. Thus, as shown, the first column of the video ram contains eight bytes 0 through 7, the second column contains eight bytes 8 through 15, the third column contains eight bytes 16 through 23, etc. It is noted that the video ram actually only contains 7 bytes in each column and the bottom row of bytes, indicated by dashed lines in FIG. 4, are considered as dummy bytes. The reason for this is to provide each column with a number of bytes corresponding to an even binary number to assist in the physical selection and identifying of the bytes in the video ram.

Upon receiving the input speed variable on the input sensor 23 to the microcomputer 10, which will be assumed to be equivalent to 30 miles per hour for purposes of this discussion, the microcomputer 10 provides for dividing this input speed variable by two to supply the number 15 since on the x-y plane of the video ram each bit on the straight line scale 41 shown in FIG. 3 corresponds to two miles per hour. This adjusted number 15 is then added to the constant 7 which is the x coordinate of the point on the x-y plane in FIG. 4 which corresponds to zero miles per hour speed on the scale 41. This defines the x coordinate of a point B on the scale 41 having an x value of 22. The value of the y coordinate of the point B is always fixed at 10 in this embodiment so as to simplify the calculations of the needle location for a given input speed variable. The point B (22,10) on the scale 41 thus corresponds to 30 miles per hour. The pivot point A of the needle 42 is a known constant on the x-y plane and in this case has the x coordinate 27 and the y coordinate 37.

A line draw utility is stored in the rom 12. Upon reading the instructions for this utility from rom 12 and placing them in the instruction register 15, the coordinates of points A and B are employed to calculate the change in x with respect to the change in y to determine the slope dy/dx of the needle to be drawn. In this case dy is 37−10=27 and dx is 27−22=5. Thus, the slope dy/dx is equal to 27/5.

It is noted that it is not possible to draw a continuous straight line between points A and B because there are a limited number of pixels in the 56×56 matrix of the EL panel 13 that can be lit up. In other words, the resolution provided on the video ram, and therefore the EL panel, is not continuous. Accordingly, to draw a needle 42 on the dial 40, several y coordinates are required to be associated with each x coordinate. As a result, the line draw utility provides for normalizing the dy/dx ratio so that it is equal to unity with the result that y equals 5 with a remainder in this instance of 2/5. This determines that there are five changes in y associated with each of the five x increments and an additional two changes in y associated with the remaining x increment.

In order to perform the algorithm of the line draw utility, one of the scratch pad registers 17 is arranged to operate as an x counter, a second of the scratch pad registers 17 is arranged to operate as a y counter, and a third of the scratch pad registers 17 is arranged to operate as a master counter.

Figure 4:
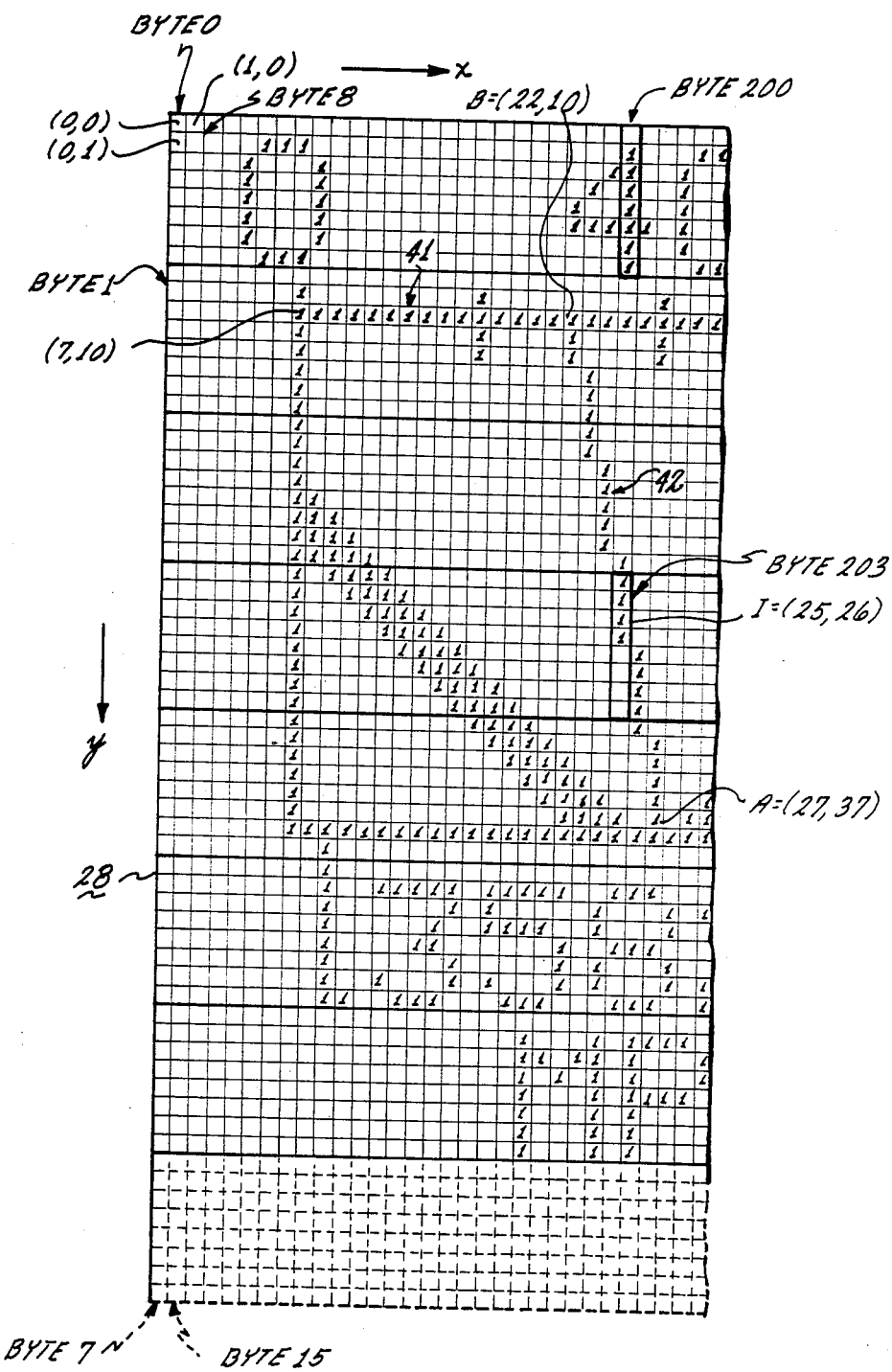
FIG. 4 is a partial showing of the video ram illustrating how data corresponding to a new position of the needle is generated and set therein by the microcomputer in response to the sensing of a change in value of the input speed variable.

Accordingly, to draw the needle 42 shown in FIG. 4, the x counter is initially set with the value 27 which is the x coordinate of the A point, the y counter is initially set with the value 37 which is the y coordinate of the A point, and the master counter is set with the value 27 which is the value of dy and corresponds to the total number of y points in the line to be drawn.

Thus, in effect, the algorithm of the line draw utility provides for decrementing the y counter five times and then decrementing the x counter one time, and then it starts all over by again providing for decrementing the y counter five times and decrementing the x counter one time. This operation just continues until the master counter, which is decremented each time the y counter is decremented, reaches zero at which time the line draw utility terminates.

It should be appreciated that the algorithm of the line draw utility utilizes counters to directly set up the change in y and the change in x as an alternate to performing division for calculating the change in y and x since the division process, on most microcomputers, tends to unduly lengthen the time required to obtain the necessary points to draw the line. In any event, in accordance with the algorithm of the line draw utility, the number of y values associated with each x value is not always the same throughout a needle but may vary due to roundoff in some instances.

It should now be clearly understood that each time the y counter is decremented by unity, the values in the x and y counters are read out to identify a coordinate point of the line to be drawn. The line draw utility thus operates in terms of bits rather than bytes. In other words, it operates in terms of providing specific points on the 56×56 matrix of the video ram 28. On the other hand, as previously described, the microcomputer 10 can only communicate with the ram 11 by the use of bytes. Hence, in order to set a bit, i e., a binary 1 digit, into the proper coordinate point of the video ram 28, for the purpose of updating the location of the needle 42, it is first necessary to use a set utility to determine the address of the byte in the video ram in which that point is located and the location of that point within that byte. That byte is then read out of the video ram and a bit is set in the proper location thereof and then the byte is returned back to the address in the video ram.

Thus, as each point of the needle is generated by the line draw utility, the set utility provides for determining the address of the byte in the video ram in which the bit corresponding to that point is to be set and actually sets the bit in that byte.

As illustrated in connection with FIG. 4, the correct byte address in video ram 28 in which to set an intermediate point I having coordinates (25,26) for example, is determined by first using the x coordinate (25) to identify the column in which the byte is located. That column is then multiplied by eight since that is how many bytes are assumed to be in each column of the video ram. That indexes or points to the byte location 200 on the matrix of the video ram 28. Then the byte location in that column and the bit location in that byte is determined by dividing the y coordinate (26) of the intermediate point I by eight which gives 3 2/8. That is interpreted as indexing or pointing down the selected column three more byte positions to byte location 203.

Having once located the byte location or address of the intermediate point I, this address 203 is placed in one of the scratch pad registers 17. Then the remainder 2/8, which determines the third bit location of the 0 to 7, inclusive, bit locations in the selected byte location, is utilized to identify a byte in a permanent table in rom 12 which stores a single bit in the third bit location thereof, namely, byte 00100000. The address of the selected byte 203 in the video ram is then placed on the address bus 37 and the contents of that byte is read out into the D register. The byte with the desired bit location in the permanent table in rom 27 is then addressed and read out and combined by the use of "and" logic into the byte in the D register so as to place the desired bit in the proper location thereof. This updated byte is then written back into the video ram 28 in its same address. It should be noted that the same byte 203 is read out of the video ram four times in the course of performing the line draw and set utilities in order to set the four intermediate points therein.

It should be especially noted that since the cycle of the microcomputer to perform a step of an instruction is only 2 to 3 microseconds long, it can be appreciated that there is no difficulty in the microcomputer 10 generating and setting the points of the needle 42 by use of the line draw and set utilities in the 8 microsecond time intervals provided between each of the 56 DMA periods, as shown by the time chart in FIG. 2. Inasmuch as the time intervals between the DMA periods in which instructions are capable of being performed by the microcomputer 10 are equal to the time intervals of the DMA periods, the only affect of the latter is to double the time needed to perform the instructions.

It should be appreciated that the microcomputer checks the input speed variable to find out if it changes on the order of every millisecond or so. If a change does occur, the new speed variable is stored in ram 27 and the line draw utility along with a reset utility operates to first erase the old needle 42 before drawing the new needle by using the coordinate points A and B that were employed to previously draw the old needle. This reset utility is identical to the line draw and set utilities used to set the bits for drawing the needle, except that instead of setting each point as generated by the line draw utility with a binary digit 1, it is set with a binary digit 0, thus resulting in the undrawing or erasing of the old needle. Following this, the new needle is then drawn by the use of the fixed A point and the new B point using the line draw utility and the set utility as previously discussed.

Figure 7:
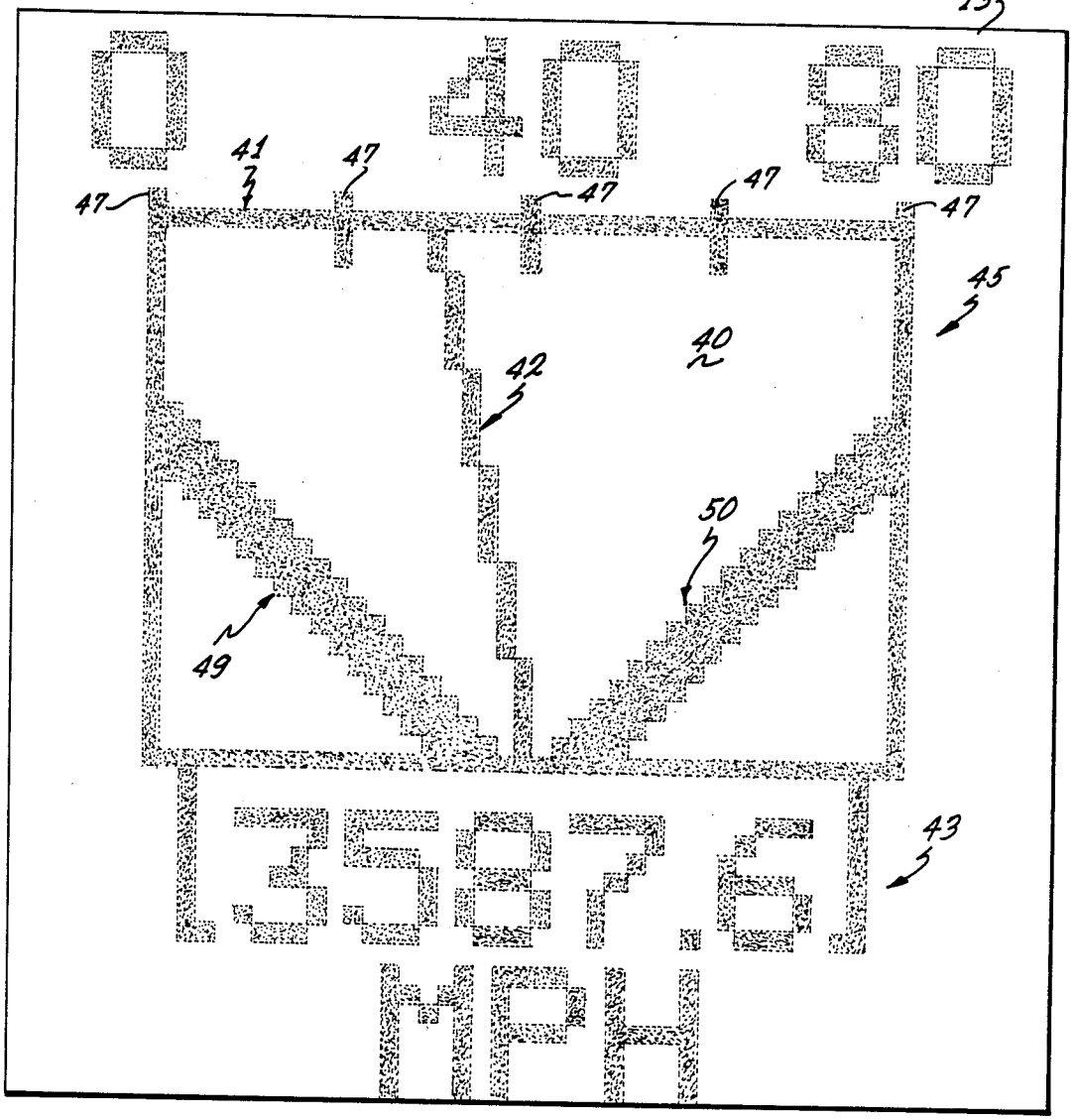
FIG. 7 is a showing of the display representation on the EL panel when the needle has been repositioned to a new location in the video ram as illustrated in FIG. 4.

FIG. 7 shows the needle 42 as calculated and drawn by the line draw and set utilities previously described in connection with the use of FIG. 4. It should be appreciated that once the vehicle starts to move and the speed increases, the location of the needle 42 is continuously being updated in the video ram 28 by drawing or erasing the old needle and rewriting the new needle so that the needle appears to be actually moving in an analog fashion to its present position on the EL panel. It is noted in FIG. 7 that the reading on the odometer 43 is now larger than it was in FIG. 3 since, of course, the reading on the odometer just keeps on advancing, in the manner as hereinafter described, as long as the vehicle is moving.

ODOMETER CONTROL

Next to be described is the manner in which the input speed variable is used to modify the digits of the odometer being stored in the video ram 28 so as to enable the odometer 43 reading to at all times precisely indicate the total miles travelled by the vehicle.

As illustrated in FIG. 3, the digit on the right end of the odometer 41 is preceded by a decimal point 48 to show that it is indicative of changes in a tenth of a mile of travel of the vehicle.

Referring to FIG. 5a, the areas provided in the video ram 28 for storing each digit consists of a 5×8 array of memory elements, as illustrated by the digit area 51. Likewise, as shown in FIG. 5b, the area provided in the user ram 27 for storing each digit consists of a similar 5×8 array of memory elements, as illustrated by area 52. As noted in FIG. 5b, for example, each column of 8 bits in a digit area 52 corresponds to a byte. Thus, the area provided for each digit consists of 5 adjacent vertical bytes.

The user ram 27 is provided with fourteen digit areas for respectively storing digits 1, 2, 3, 4, 5, 6, 7, 8, 9, 0, 0, 0, 0 and 0. The bytes forming each of the successive digit areas 1 through 9 and the first digit 0 are in sequentially addressed locations in the user ram 27. In other words, the digit area storing digit 1 is defined by 5 bytes which are sequentially addressed, the digit area storing digit 2 is defined by 5 bytes which are sequentially addressed to follow the bytes of digit 1, etc. Thus, all the digits 1 through 9 and the first digit 0 are all sequentially addressed.

Referring to FIG. 5a, the digit area 51 of video ram 28 which corresponds to the least significant digit, i.e., the tenths digit, of the odometer 43 is shown to store the digit 4. As the vehicle travels, this tenths digit 4 in the digit area 51 is scrolled upwardly and replaced by the next sequential digit 5 which is shown in FIG. 5b as being located in the digit area 52 of the user ram 27.

The vertical scroll utility provides for incrementally shifting the upper bit position of area 52 in the user ram into the lower bit position of the area 51 in the video ram. Since there are eight vertical bits in each digit area, it takes eight vertical one-bit shifts to replace the digit 4 in the digit area 51 of the video ram with the digit 5 in the digit area 52 of the user ram. The successive frames of these digit areas 51 and 52 in FIGS. 5a and 5b, respectively, show the contents thereof after each one-bit vertical shifting or scrolling takes place.

Figure 6:
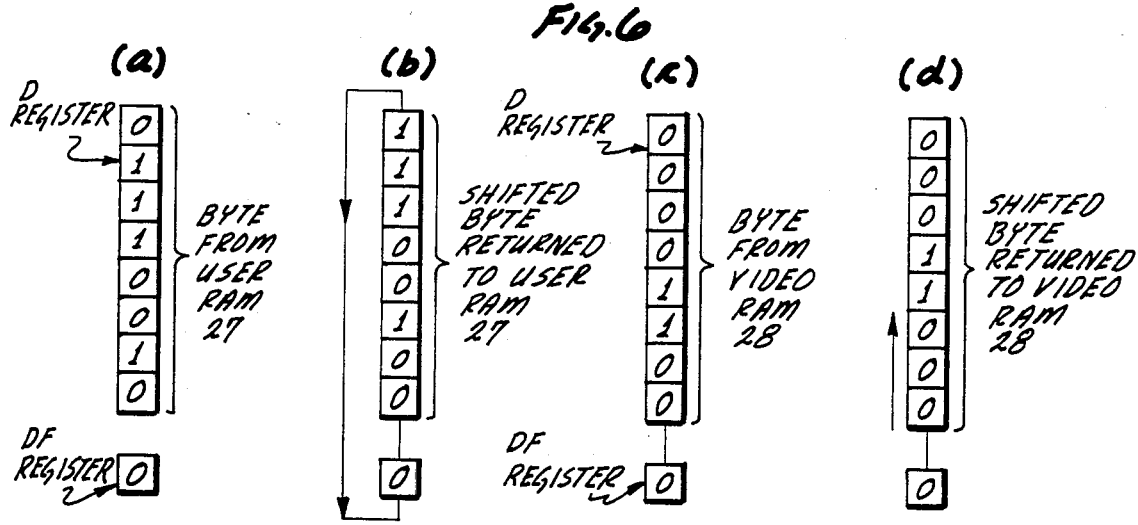
FIG. 6 shows the successive steps for scrolling a byte of a digit area in the user ram into a similarly positioned byte of a digit area in the video ram.

In order to understand how the vertical scrolling takes place, reference will be made to FIG. 6. As illustrated in FIG. 6(a), the first byte 01110010 on the left of digit 5 in area 52 is first addressed and read out of the user ram 27 and placed in the D register. The D register which is an eight bit register has associated therewith in the microcomputer 10 the DF register which is a one bit register. As next illustrated in FIG. 6(b) the byte in the D register is recirculated one bit position upwardly causing the top bit 0 in the D register to be shifted into the DF register. The shifted byte 11100100 in the D register is then returned to the first byte position of the digit area 52 in the user ram 27. As illustrated in FIG. 6(c) the first byte 00001100 of the digit 4 in the digit area 51 of the video ram 28 is then addressed and read out and placed in the D register. As illustrated in FIG. 6(d), this byte in the D register is then shifted upwardly 1 bit position resulting in the bit 0 in the DF register being shifted into the lower bit position of the D register. The bit in the upper bit position of the D register is discarded since it is no longer needed. This shifted byte 00011000 is then returned to the first byte position of the digit area 51 in the video ram 28.

It should now be clearly understood that after the first one-bit shift of all five bytes of the digit area 52 in the user ram 27 into the corresponding five bytes of the digit area 51 of the video ram 28, the contents of these digit areas 51 and 52 now appear as shown in the second frames thereof in FIGS. 5a and 5b.

It should now be clear that after the second one-bit shift of all five bytes of the digit area 52 of the user ram 27 into the corresponding five bytes of the digit area 51 of the video ram, the contents of these digit areas 51 and 52 now appear as shown in the third frames thereof in FIGS. 5a and 5b. This one-bit shifting of the contents of the digit areas continues, as illustrated in FIGS. 5a and 5b, resulting in the digit 4 in the least significant digit area 51 of the video ram 28 being replaced by the digit 5 in the digit area 52 of the user ram 27 after the eighth one-bit shift. Since each digit in the user ram gets lost upon being shifted into the video ram, the microcomputer 10 provides for rewriting that digit on the user ram at that time.

It should now be pointed out that the rate of the vertical one-bit shifting of the digit in a digit area of the user ram into the digit area of the video ram is determined by employing the value of the input speed variable as sensed at the input sensor 23 of the microcomputer 10.

Since it is known how many one-bit shifts it takes to change a digit and since it is also known how many digits have to be successively scrolled in a given time, i.e., a given number of miles per hour, it is possible to calculate how many shifts the tenths digit of the odometer must make to obtain the desired rate of change.

As an example, assume that the vehicle is traveling at 30 miles per hour, as indicated by the presentation in connection with FIG. 4. Now then, if at the beginning of one hour of travel at that speed it is assumed that the odometer reads 0000.0 miles, at the end of the hour the odometer should read 0030.0 miles. Since the least significant digit is in tenths of a mile it was necessary to go through three hundred complete changes of the tenths digits to go from zero to 30 miles and since it requires eight one-bit shifts for each digit, a grand total of 2400 one-bit shifts of the tenths digit has to be executed in that one hour period. Therefore, when 3600 seconds /hour is divided by 2400 shifts it is determined that for a speed of 30 miles per hour a one-bit shift of the tenths digit must be made every 1.5 seconds. If the speed had been twice that (60 mph) then the shifts would have been twice as frequent, i.e., once every 0.75 seconds. From the above example, a formula can be derived which can be used to calculate the necessary delay time between the one-bit shifts of the tenths digit for any speed. Thus the delay in seconds between one-bit shifts is simply 45 divided by the speed in miles per hour as indicated by the speed input variable.

Thus, to calculate the necessary delay time in seconds between the one-bit shifts of the tenths digit, the microcomputer 10 reads the input speed variable and divides it into 45. The microcomputer 10 then sets the timer 26 to provide a pulse spaced by this time delay for use in initiating the operation of each of the vertical one-bit shifts or scrolls of the tenths digit of the odometer, as illustrated in FIG. 5a. While the microcomputer 10 is waiting for a pulse from the timer 26, it can do other operations, such as needed to draw the needle 42 and also keeps checking the analog sensor 23 for changes in the speed of the vehicle. Thus, if the speed were to suddenly increase or decrease then the microcomputer 10 would immediately react to shorten or lengthen the time interval, respectively, between calling for the vertical one-bit scrolling of the tenths digit of the odometer 43. It should be appreciated that once the vehicle starts to travel, the tenths digit appears to be actually continually rolling upwardly in an analog fashion to advance the reading of the odometer of the EL panel.

It should be especially noted that the distance of travel of the vehicle as indicated by the odometer 43 is actually indirectly determined by how fast the least significant digit, i.e., the tenths digit thereof is scrolled upwardly to advance the number shown on the odometer 43.

As illustrated in FIGS. 8a–8c, whenever the digit in the least significant digit position 51 of the odometer 43 advances from a 9 to a 0, the digit in the units position 55 of the odometer will be increased by unity. In a similar manner, whenever any digit in the odometer 43 advances from a 9 to a 0, the digit in the next higher order digit position of the odometer must be increased by unity. Accordingly, in order to perform the changing of each higher order digit when the next lower order digit changes from a 9 to a 0, an address is stored in ram 11 for each digit order or position in the odometer, except the tenths digit position, indicating where the next sequential digit should be addressed in the user ram. Thus, whenever a lower order digit changes from a 9 to a 0, that condition is detected and causes the address stored in ram for the next higher order digit position to be used to take the next sequential digit out of the user ram and scroll it into that next higher order digit position in the video ram. The one-bit scrolling of the next sequential digit into that next higher order digit position is performed immediately after the one-bit scrolling of the tenths digit, such that these two digits appear to be simultaneously rolling up in the odometer representation on the EL panel.

It should be noted that the reason for storing the digits 1 through 9 and 5 zeros in the user ram is because the digits 1 through 9 never have to be scrolled more then one at a time. However, when the odometer changes to all 0 digits from a reading of 9999.9, for example, it is necessary to simultaneously shift a zero digit into all the digit positions of the odometer and it is necessary to provide a separate zero digit for shifting into each digit position of the video ram.

While the speedometer display simulation on the EL panel as shown and described herein is admirably adapted to fulfill the objects and advantages previously mentioned as desirable, it is to be understood that the invention is not limited to the specific features shown and described but that the means and method herein disclosed are susceptible of modification in form, proportion, and arrangement of parts without departing from the principles involved or sacrificing any of its advantages and the invention, therefore, may be modified in various forms within the scope of the appended claims.

What is claimed is:

1. An electronic display system for displaying a representation of an analog speedometer for a vehicle, said system comprising:

a visual display means including an electroluminescent panel having a two-coordinate array of pixels;

a microcomputer means;

an input to said microcomputer means for supplying a variable indicative of the speed of said vehicle;

a video memory having a two-coordinate array of memory elements, each said memory element corresponding to a pixel on said panel;

said microcomputer means providing for storing data bits in said video memory representing a scale marked with indicia indicating a measure of speed of said vehicle, a rotating needle having a fixed point and an end point movable along said scale, and an odometer having a plurality of adjacent digit areas, each said digit area comprising a rectangular array of memory elements for storing a pattern of data bits defining a digit of a plural digit number indicating a distance travelled by said vehicle;

a user memory having ten sequentially addressable digit areas, each said sequentially addressable digit area comprising a rectangular array of memory elements as provided for the digit areas in the video memory, said sequentially addressable digit areas respectively storing a pattern of data bits defining the digits 0 through 9;

said microcomputer means operable to periodically respond to the input speed variable to determine a new end point of the needle on said scale and to generate and store data bits in said video memory intermediate said fixed and new end points to define a new representation of said needle;

a timer;

said microcomputer means periodically setting said timer as a function of said input speed variable to provide time interval signals;

said microcomputer means operable in response to each time interval signal to initiate a one-bit vertical shift of the digit pattern in the least sigificant digit area of the odometer representation in the video memory and a one-bit vertical shift of the digit pattern in the sequentially addressable digit area of the user memory into said least significant digit area of said video memory; and said microcomputer means alternately operable to supply data bits from the memory elements of said video memory to said visual display means for visual display on corresponding pixels of said panel and to update said data bits in said video memory as a function of the input speed variable.

2. An electronic display system for displaying a representation of an analog speedometer for a vehicle as defined in claim 1 wherein said microcomputer means provides for erasing the intermediate data bits stored in said video memory defining the old needle prior to generating and storing intermediate data bits therein defining a new needle.

3. An electronic display system for displaying a representation of an analog speedometer for a vehicle as defined in claim 1 wherein the least significant digit area of the odometer in said video memory corresponds to the tenths of a mile, wherein eight one-bit vertical shifts are required to replace a digit pattern in the least significant digit area of the video memory with a digit pattern in the sequentially addressable digit area in the user memory; and wherein said microcomputer provides for dividing the number 45 by the input speed variable in miles per hour to determine a time interval in seconds that is set in the timer to provide each time interval signal for initiating a one-bit vertical shift of the digit pattern in the least significant digit area of the video memory and a one-bit vertical shift of the digit pattern in the sequentially addressable digit area of the user memory into said least significant digit area of said video memory.

4. An electronic display system for displaying a representation of an analog speedometer for a vehicle as defined in claim 1 wherein the microcomputer means provides for storing in the user memory an address of the digit pattern currently in each digit position of the odometer in the video memory other than the least significant digit position thereof and wherein the microcomputer means provides for a one-bit vertical shift of the digit pattern in a sequentially addressed digit area of the user memory into any respective one of said odometer digit positions in the video memory when the digit pattern in the adjacent lower order digit position in said odometer is changing from a 9 to a 0.

5. An electronic display system for displaying a representation of an analog speedometer for a vehicle as defined in claim 1 wherein a pattern of data bits defining a 0 digit for each of the digit positions of the odometer in the video memory other than the least significant digit position thereof is stored in a uniquely addressed digit area of the user memory, and whereby when a digit 9 is stored in each of the odometer digit positions of the video memory a digit 0 in a sequentially addressed digit area is vertically shifted one bit at a time into the least significant digit position of the odometer and a digit 0 from each of the uniquely addressed digit areas of the user memory is synchronously vertically shifted one bit at a time into each of the odometer higher order digit positions of the video memory in response to each time interval signal from the timer.

* * * * *